US012771399B2

(12) United States Patent
Seo et al.

(10) Patent No.: US 12,771,399 B2
(45) Date of Patent: Oct. 20, 2026

(54) TRANSCEIVER INCLUDING BIDIRECTIONAL SWITCHING NETWORK CIRCUIT

(71) Applicants: SK hynix Inc., Icheon (KR); Seoul National University R&DB Foundation, Seoul (KR)

(72) Inventors: Sanghyuk Seo, Seoul (KR); Suhwan Kim, Seoul (KR)

(73) Assignees: SK hynix Inc., Icheon (KR); Seoul National University R&DB Foundation, Seoul (KR)

( * ) Notice: Subject to any disclaimer, the term of this patent is extended or adjusted under 35 U.S.C. 154(b) by 274 days.

(21) Appl. No.: 18/653,774

(22) Filed: May 2, 2024

(65) Prior Publication Data

US 2025/0219675 A1 Jul. 3, 2025

(30) Foreign Application Priority Data

Dec. 27, 2023 (KR) ........................ 10-2023-0192190

(51) Int. Cl.
*H04B 1/44* (2006.01)
*H04B 1/405* (2015.01)

(52) U.S. Cl.
CPC ............... *H04B 1/44* (2013.01); *H04B 1/405* (2013.01)

(58) Field of Classification Search
CPC ............. H04B 1/44; H04B 1/405; H04B 1/50
See application file for complete search history.

(56) References Cited

U.S. PATENT DOCUMENTS 7,330,514 B1 2/2008 Ahmad
2017/0338854 A1* 11/2017 Perumana ................ H03F 3/62
2022/0416582 A1* 12/2022 Tahavorgar ........... H04L 1/0041
2025/0190357 A1* 6/2025 Maia Da Silva ... G06F 12/0893

FOREIGN PATENT DOCUMENTS

KR 10-0674953 B1 1/2007

OTHER PUBLICATIONS

Kwanyeob Chae et al., "A 4nm 1.15TB/s HBM3 Interface with Resistor-Tuned Offset-Calibration and In-Situ Margin-Detection," 2023 IEEE International Solid-State Circuits Conference (ISSCC), 2023, pp. 1-3, doi: 10.1109/ISSCC42615.2023.10067736.

(Continued)

*Primary Examiner* — John J Lee

(57) ABSTRACT

A transceiver connected to a specific channel via a channel connection node, the transceiver includes a transmitter driving a first node and a second node based on an input data signal in a transmission mode, the first node connected to the channel connection node; a receiver receiving a specific channel signal from the channel connection node and providing an output data signal based on the channel signal and an input differentiation signal in a reception mode, the input differentiation signal being generated based on at least one first output differentiation signal; and a switch network circuit connected between the second node and the channel connection node. The switching network circuit has a first circuit in the transmission mode and a second circuit in the reception mode, and provides at least one second output differentiation signal by differentiating the channel.

19 Claims, 6 Drawing Sheets

(56) References Cited

OTHER PUBLICATIONS

Han-Gon Ko et al., "An 8Gb/s/µm FFE-Combined Crosstalk-Cancellation Scheme for HBM on Silicon Interposer with 3D-Staggered Channels," 2020 IEEE International Solid-State Circuits Conference (ISSCC), 2020, pp. 128-130, doi: 10.1109/ISSCC19947.2020.9063162.
Soo-Min Lee et al., "An 8nm 18Gb/s/pin GDDR6 PHY with TX Bandwidth Extension and RX Training Technique," 2020 IEEE International Solid-State Circuits Conference (ISSCC), 2020, pp. 338-340, doi: 10.1109/ISSCC19947.2020.9062937.
Taehyoun Oh et al., "A 12-GB/s Multichannel I/O Using MIMO Crosstalk Cancellation and Signal Reutilization in 65-nm CMOS," IEEE Journal of Solid-State Circuits, Jun. 2013, pp. 1383-1397, vol. 48, No. 6, doi: 10.1109/JSSC.2013.2252517.
Cosimo Aprile et al., "An Eight-Lane 7-GB/s/pin Source Synchronous Single-Ended RX With Equalization and Far-End Crosstalk Cancellation for Backplane Channels," IEEE Journal of Solid-State Circuits, Mar. 2018, pp. 861-872, vol. 53, No. 3, doi: 10.1109/JSSC.2017.2783679.
Kwangho Lee et al., "An Adaptive Offset Cancellation Scheme and Shared-Summer Adaptive DFE for 0.068 pJ/b/dB 1.62-to-10 GB/s Low-Power Receiver in 40 nm CMOS," IEEE Transactions on Circuits and Systems II: Express Briefs, Feb. 2021, pp. 622-626, vol. 68, No. 2, doi: 10.1109/TCSII.2020.3014925.

* cited by examiner

TRANSCEIVER INCLUDING BIDIRECTIONAL SWITCHING NETWORK CIRCUIT

CROSS-REFERENCE TO RELATED APPLICATION

The present application claims priority under 35 U.S.C. § 119(a) to Korean Patent Application No. 10-2023-0192190, filed on Dec. 27, 2023, which is incorporated herein by reference in its entirety.

BACKGROUND

1. Technical Field

Various embodiments generally relate to transceiver, and more specifically, to a transceiver including a bidirectional switching network circuit.

2. Related Art

As bandwidth required for memory devices increases, density and data transfer rates are increasing.

As the data transmission rate per pin increases in a single-ended memory interface, noise due to inter-symbol interference (ISI) increases, and as the pins and transmission lines becomes closer, crosstalk noise increases.

In the conventional technology, ISI noise and crosstalk noise cannot be removed simultaneously.

Additionally, in the conventional technology, the area of required circuitry to remove noise may increase excessively as the number of pins increases.

Accordingly, a circuit that can simultaneously remove ISI noise and crosstalk noise without significantly increasing the circuit area is desirable.

SUMMARY

In accordance with an embodiment of the present disclosure, a transceiver connected to a specific channel via a channel connection node, the transceiver may include a transmitter configured to drive a first node and a second node based on an input data signal in a transmission mode, the first node connected to the channel connection node; a receiver configured to receive a specific channel signal from the channel connection node and provide an output data signal based on the channel signal and an input differentiation signal in a reception mode, the input differentiation signal being generated based on at least one first output differentiation signal, the first output differentiation signal being obtained by differentiating at least one other channel signal received from at least one other channel than the specific channel; and a switch network circuit connected between the second node and the channel connection node. The switching network circuit has a first circuit in the transmission mode. In the reception mode, the switching network circuit has a second circuit, and provides at least one second output differentiation signal by differentiating the channel signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments in view of teachings of the present disclosure. The detailed description is not meant to limit this disclosure. Rather, the scope of embodiments of the present disclosure is defined in accordance with claims and equivalents thereof.

Figure 1:
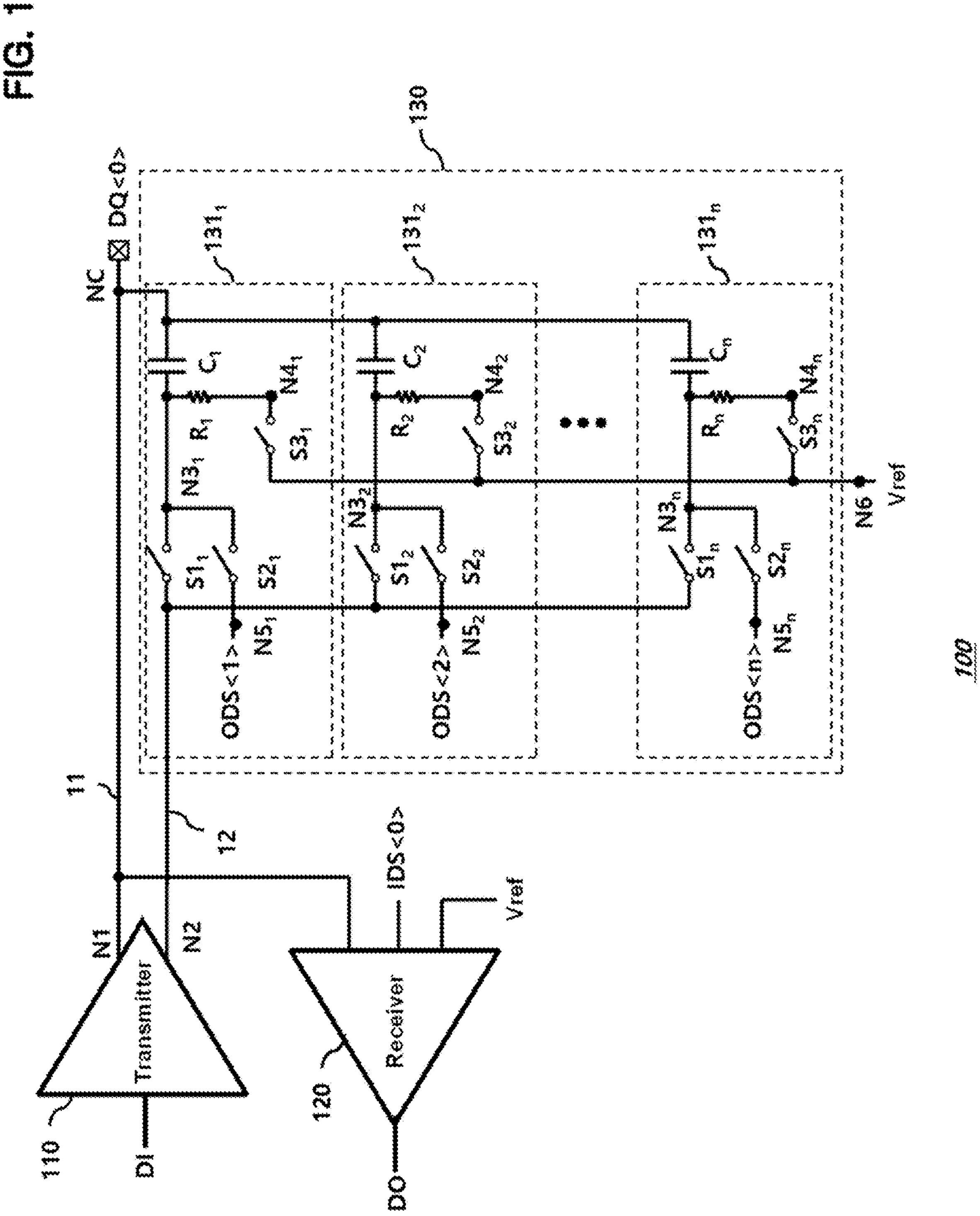
FIG. 1 illustrates a transceiver according to an embodiment of the present disclosure.

FIG. 1 is a circuit diagram showing a transceiver 100 according to an embodiment of the present disclosure.

In FIG. 1, the transceiver 100 represents a transceiver connected to $0^{th}$ channel among (n+1) channels of a multi-channel transceiver system, where n is a natural number. Hereinafter, an $i^{th}$ channel may be represented as a channel #i, where i is an integer being equal to or smaller than n. For example, the (n+1) channels may be System-in-Package (SiP) channels in High Bandwidth Memory (HBM).

The transceiver 100 of FIG. 1 may be included in each of two devices connected to a transmission line corresponding to the channel #0.

At this time, the transceiver 100 included in one of the two devices performs a transmission operation, and the other transceiver (not shown) included in the other device performs a reception operation. In an embodiment, the other transceiver may have substantially the same configuration as that of the transceiver 100, whereas the other transceiver in the other device performing a reception operation may have activated elements different from those of the transceiver 100 in the device performing a transmission operation to constitute different circuits according to the respective operation modes. Since the same configuration of a transceiver can be implemented in different devices, fabrication processes of the devices may be simplified according to an embodiment of the present disclosure.

Accordingly, the transceiver 100 of FIG. 1 can be referred to as the $0^{th}$ transceiver $\mathbf{100}_0$, and the transceiver connected to the channel #n can be referred to as the $n^{th}$ transceiver $\mathbf{100}_n$. Hereinafter, an $i^{th}$ transceiver may be represented as a transceiver #i.

In FIG. 1, n is equal to or greater than 3. Since embodiments where n is 1 or 2 are obvious in view of teachings of the following disclosure, separate disclosure for these cases is omitted for the interest of brevity.

The transceiver 100 according to this embodiment of FIG. 1 includes a transmitter 110, a receiver 120, and a switching network circuit 130.

Figure 2:
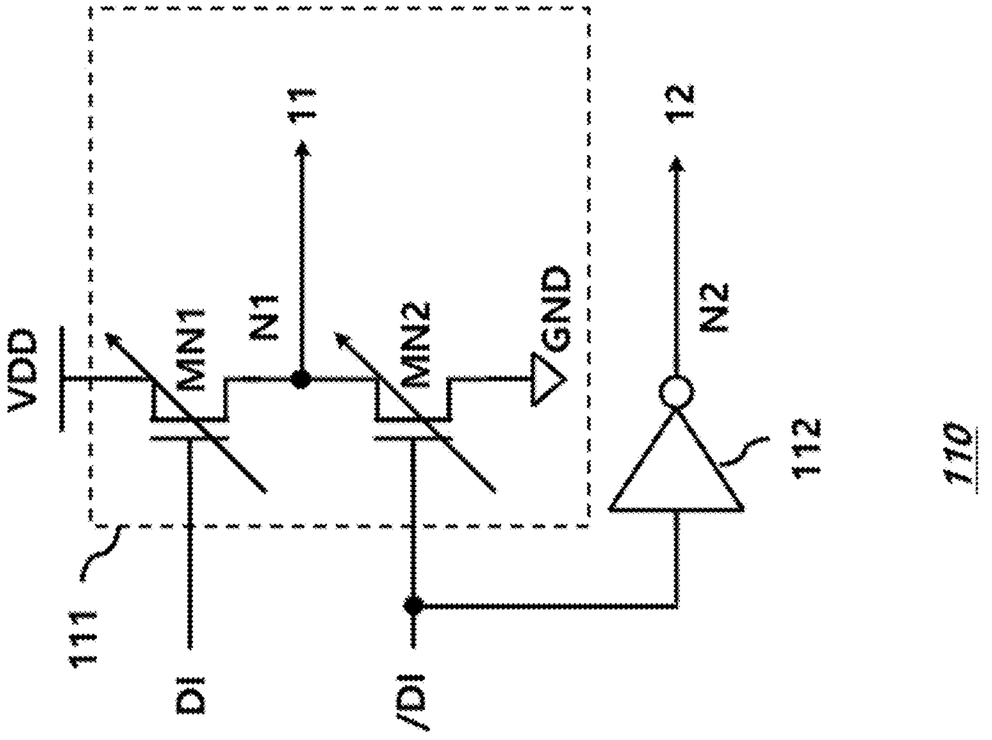
FIG. 2 illustrates a transmitter according to an embodiment of the present disclosure.

The transmitter 110 drives a first line 11 connected to a first node N1 (e.g., a first node N1 in FIG. 2) and a second line 12 connected to a second node N2 (e.g., a node N2 corresponding to an output of an inverter circuit 112 in FIG. 2) according to an input data signal DI.

FIG. 2 is a circuit diagram showing the transmitter 110 of FIG. 1 according to an embodiment of the present disclosure.

The transmitter 110 includes a driving circuit 111 that drives the first line 11 according to the input data signal DI and an inverted version of the input data signal (e.g., an inverted input data signal)/DI obtained by inverting the input data signal DI and includes an inverter circuit 112 that drives the second line 12 by inverting the inverted input data signal/DI.

The driving circuit 111 may have an N-over-N circuit configuration and its operation that are known in the art.

A first transistor (e.g., NMOS transistor) MN1 whose first terminal (e.g., source) and second terminal (e.g., drain) are connected to a first power source VDD and the first node N1, respectively and a second transistor (e.g., NMOS transistor) MN2 whose first terminal (e.g., source) and second terminal (e.g., drain) are connected to the first node N1 and a second power source GND, respectively.

The input data signal DI is applied to a gate of the first NMOS transistor MN1, and the inverted input data signal/DI is applied to a gate of the second NMOS transistor MN2.

Returning back to FIG. 1, the receiver 120 receives a channel signal DQ<0> received through a channel connection node NC and an input differentiation signal IDS<0> and outputs an output data signal DO.

An input terminal of the receiver 120 that receives an input differentiation signal (e.g., the input differentiation signal IDS<0>) may be referred to as a differentiation signal input terminal.

The input differentiation signal IDS<0> corresponds to a sum of output differentiation signals provided for the channel #0 from a $1^{st}$ transceivers to an $n^{th}$ transceiver.

The structure of the receiver 120 and the input differentiation signal IDS and the output differentiation signal ODS are described in detail below.

The switching network circuit 130 in FIG. 1 includes n sub-switching network circuits $\mathbf{131}_1$ to $\mathbf{131}_n$ connected between the second node N2 and the channel connection node NC.

At this time, the sub-switching network circuit $\mathbf{131}_1$ to $\mathbf{131}_n$ corresponds to other channels other than a specific channel to which the channel connection node NC is connected among the plurality of channels.

For example, FIG. 1 shows n sub-switching network circuits $\mathbf{131}_1$, $\mathbf{131}_2$, . . . , $\mathbf{131}_n$ corresponding to channel #1 to channel #n, other than channel #0 to which the channel connection node NC is connected. Hereinafter, an $i^{th}$ sub-switching network circuit may be represented as a sub-switching network circuit #i.

The structure of each sub-switching network circuit is the same, and a corresponding channel is indicated with a subscript.

For example, the sub-switching network circuit #1 $\mathbf{131}_1$ includes a capacitor $C_1$ connected between the channel connection node NC and a third node $\mathbf{N3}_1$, and a resistor $R_1$ connected between the third node $\mathbf{N3}_1$ and a fourth node $\mathbf{N4}_1$, a first switch $\mathbf{S1}_1$ connected between the second node N2 and the third node $\mathbf{N3}_1$, a second switch $\mathbf{S2}_1$ connected between a fifth node $\mathbf{N5}_1$ and the third node $\mathbf{N3}_1$, and a third switch $\mathbf{S3}_1$ connected between the fourth node $\mathbf{N4}_1$ and a sixth node N6.

Here, the second node N2, the channel connection node NC, and the sixth node N6 are commonly connected to a plurality of sub-switching network circuits $\mathbf{131}_1$ to $\mathbf{131}_n$, so no subscripts are used.

Hereinafter, a case in which the transceiver 110 performs a transmission operation is referred to as a transmission mode, and a case in which the transceiver 110 performs a reception operation is referred to as a reception mode.

In the transmission mode, the first switch S1 is turned on and the second switch S2 and the third switch S3 are turned off. For example, in the transmission mode, the first switches $\mathbf{S1}_1$ to $\mathbf{S1}_n$ of the sub-switching network circuits $\mathbf{131}_1$ to $\mathbf{131}_n$ are turned on, the second switches $\mathbf{S2}_1$ to $\mathbf{S2}_n$ of the sub-switching network circuits $\mathbf{131}_1$ to $\mathbf{131}_n$ are turned off, and the third switches $\mathbf{S3}_1$ to $\mathbf{S3}_n$ of the sub-switching network circuits $\mathbf{131}_1$ to $\mathbf{131}_n$ are turned off.

In the reception mode, the first switch S1 is turned off and the second switch S2 and the third switch S3 are turned on. For example, in the reception mode, the first switches $\mathbf{S1}_1$ to $\mathbf{S1}_n$ of the sub-switching network circuits $\mathbf{131}_1$ to $\mathbf{131}_n$ are turned off, the second switches $\mathbf{S2}_1$ to $\mathbf{S2}_n$ of the sub-switching network circuits $\mathbf{131}_1$ to $\mathbf{131}_n$ are turned on, and the third switches $\mathbf{S3}_1$ to $\mathbf{S3}_n$ of the sub-switching network circuits $\mathbf{131}_1$ to $\mathbf{131}_n$ are turned on.

In the reception mode, the resistor $R_1$ and the capacitor $C_1$ operate as a differentiation circuit (or a differentiator circuit) that differentiates the channel signal DQ<0>, and outputs an output differential signal ODS<1> at the fifth node $\mathbf{N5}_1$. That is, the first output differentiation signal ODS<1> is output from the fifth node $\mathbf{N5}_1$ of the first sub-switching network circuit $\mathbf{131}_1$.

At this time, the size and delay amount of the differentiation signal can be adjusted by adjusting the resistance and capacitance of the resistor R and the capacitor C.

As described above, the receiver 120 receives an input differentiation signal IDS. For example, the input differentiation signal #0 IDS<0> is input to the differentiation signal input terminal of the receiver 120 corresponding to the channel #0.

In an embodiment, the receiver 120 may receive a channel signal from the channel connection node NC and provide an output data signal DO based on the channel signal and an input differentiation signal IDS<0> in a reception mode. The input differentiation signal IDS<0> may be generated based on at least one output differentiation signal. For example, the at least one output differentiation signal may be obtained by differentiating at least one channel signal received from at least one other channel than the channel #0. For example, the input differentiation signal #0 IDS<0> is the sum of n number of $0^{th}$ output differentiation signals provided from the n switching network circuits $\mathbf{130}_1$ to $\mathbf{130}_n$. Specifically, other n transceivers $\mathbf{100}_1$ to $\mathbf{100}_n$ (not shown) may be connected to n channels #1 to #n, respectively, and may include n switching network circuits $\mathbf{130}_1$ to $\mathbf{130}_n$ (not shown), respectively. Each of the n switching network circuits $\mathbf{130}_1$ to $\mathbf{130}_n$ may include a sub-switching network circuit $\mathbf{131}_0$ (not shown) that receives a corresponding one of channel signals DQ<1> to DQ<n> from a channel other than the channel #0, and differentiates the received channel signal to output a $0^{th}$ output differentiation signal differentiation signal ODS<0> (not shown). The input differentiation signal #0 IDS<0> may be a sum of these $0^{th}$ output differentiation signals ODS<0> provided from the sub-switching network circuits $\mathbf{131}_0$ of the n switching network circuits $\mathbf{130}_1$ to $\mathbf{130}_n$, respectively.

To this end, n $0^{th}$ output differentiation signals output from n switching sub-network circuits $\mathbf{130}_1$ to $\mathbf{130}_n$ are provided to the differentiation signal input terminal of the receiver 120 included in the $0^{th}$ transceiver 100 connected to the channel #0.

Figure 3:
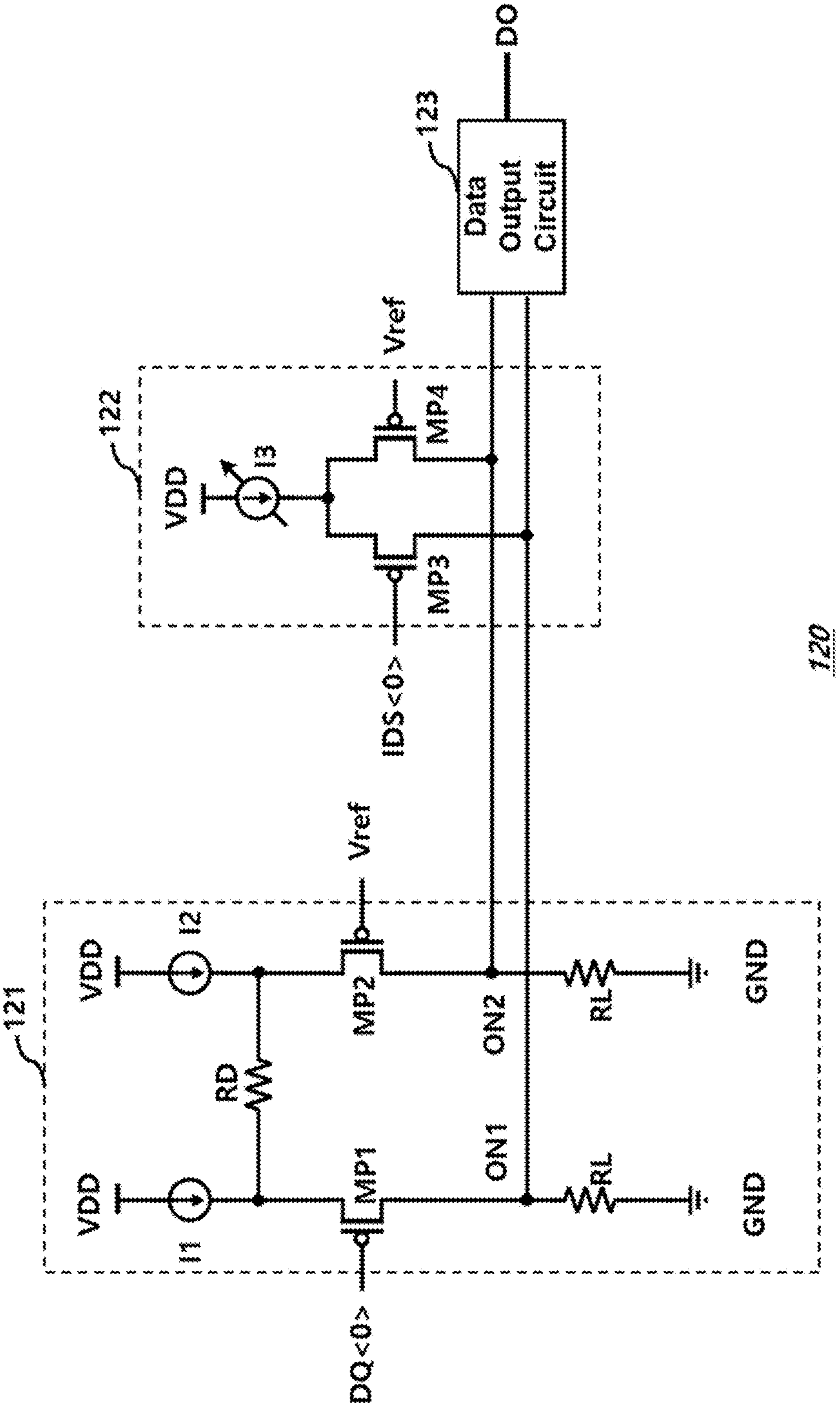
FIG. 3 illustrates a receiver according to an embodiment of the present disclosure.

FIG. 3 is a circuit diagram showing the receiver 120 according to an embodiment of the present disclosure.

The receiver 120 includes a signal receiving circuit 121, a differentiation signal receiving circuit 122, and a data output circuit 123.

In FIG. 3, the signal receiving circuit 121 and the differential signal receiving circuit 122 are current mode logic (CML) type circuits.

The configuration and operation method of the CML type circuits are known in the art. Therefore, some of detailed descriptions thereof may be omitted for the interest of brevity.

The CML type circuit can be implemented using NMOS transistors or PMOS transistors, but in this embodiment, it is implemented using PMOS transistors.

The signal receiving circuit 121 includes a first PMOS transistor MP1 whose gate receives a channel signal DQ<0> and a second PMOS transistor MP2 whose gate receives a reference voltage Vref.

The channel signal DQ<0> is provided through the first line 11 in FIG. 1.

A source of the first PMOS transistor MP1 is connected to a current source I1 which is connected to the first power source VDD, and a source of the second PMOS transistor MP2 is connected to a current source I2 connected to the first power source VDD.

The source of the first PMOS transistor MP1 and the source of the second PMOS transistor MP2 are connected to each other through a resistor RD.

A load resistor RL is connected between a drain of the first PMOS transistor MP1 and the second power source GND, and a load resistor RL is connected between a drain of the second PMOS transistor MP2 and the second power source GND.

The drain of the first PMOS transistor MP1 is connected to a first output node ON1, and a drain of the second PMOS transistor MP2 is connected to a second output node ON2.

When voltage of the channel signal DQ<0> is smaller than the reference voltage Vref, voltage of the first output node ON1 becomes greater than the voltage of the second output node ON2.

The differentiation signal receiving circuit 122 includes a third PMOS transistor MP3 having a gate receiving the input differentiation signal IDS<0>, and a fourth PMOS transistor MP4 having a gate receiving the reference voltage Vref.

The input differentiation signal IDS<0> is provided from transceivers connected to other channels as described above.

A current source I3 is connected between the first power source VDD and a source of the third PMOS transistor MP3 and a source of the fourth PMOS transistor MP4.

In the embodiment of FIG. 3, the drain of the third PMOS transistor MP3 is connected to the first output node ON1, and the drain of the fourth PMOS transistor MP4 is connected to the second output node ON2. However, embodiments of the present disclosure are not limited thereto.

In another embodiment, considering crosstalk direction according to channel characteristics, the drain of the third PMOS transistor MP3 may be connected to the second output node ON2, and the drain of the fourth PMOS transistor MP4 may be connected to the first output node ON1.

The differentiation signal receiving circuit 122 operates so that when the input differentiation signal IDS<0> is greater than the reference voltage Vref, voltage increase of the first output node ON1 becomes smaller than voltage increase of the second output node ON2.

In addition, the differentiation signal receiving circuit 122 operates so that when the input differentiation signal IDS<0> is smaller than the reference voltage Vref, voltage increase of the first output node ON1 becomes greater than voltage increase of the second output node ON2.

The data output circuit 123 generates an output data signal DO by detecting the difference between the first output node ON1 and the second output node ON2.

Figure 4:
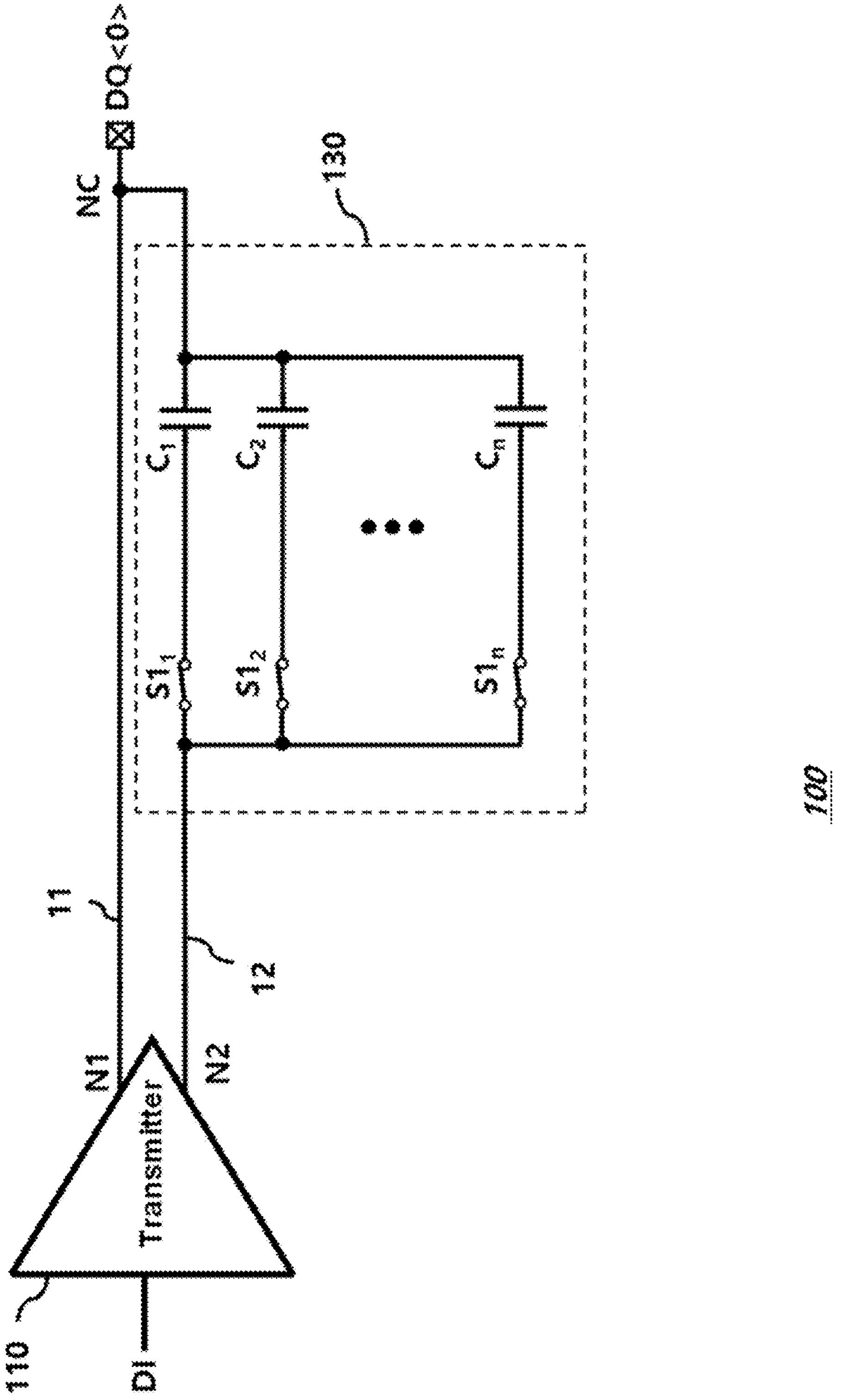
FIG. 4 illustrates a transceiver in a transmission mode according to an embodiment of the present disclosure.

FIG. 4 is a circuit diagram showing a transceiver 100 in the transmission mode according to an embodiment of the present disclosure.

In the transmission mode, the first switch S1 is turned on and the second switch S2 and the third switch S3 are turned off, and the switching network circuit 130 is connected between the second node N2 and the channel connection node NC. Therefore, the switching network circuit 130 has a structure where n capacitors are connected in parallel between the second node N2 and the channel connection node NC. In other words, in the transmission mode, the switching network circuit 130 has a first circuit including the n capacitors $C_1$ to $C_n$ of the switching network circuit 130 connected in parallel between the second node N2 and the channel connection node NC. The n capacitors $C_1$ to $C_n$ of the first circuit constitute a single equivalent capacitor having a capacitance that is a sum of capacitances of the n capacitors $C_1$ to $C_n$.

The signal driven by the transmitter 110 is provided to the channel #0 through the channel connection node NC and the first line 11.

Considering the internal structure of the transmitter 110 of FIG. 2, an equivalent resistor of the transmitter 110 is connected to the first line 11, and an equivalent capacitor of switching network circuit 130 is connected to the second line 12 as shown in FIG. 4.

At this time, equivalent resistance of the transmitter 110 corresponds to turn-on resistance of the first NMOS transistor MN1 or the second NMOS transistor MN2 in FIG. 2.

At this time, the degree of pre-emphasis operation can be adjusted by adjusting the size of the turn-on resistance and capacitance.

Pre-emphasis operation may significantly reduce or substantially remove inter-symbol interference (ISI). For example, pre-emphasis operation may boost high-frequency components of a signal that are susceptible to ISI before the signal is transmitted through a transmission line. As a result, pre-emphasis operation using the switching network circuit 130 according to an embodiment of the present disclosure can significantly reduce or substantially remove ISI.

Figure 5:
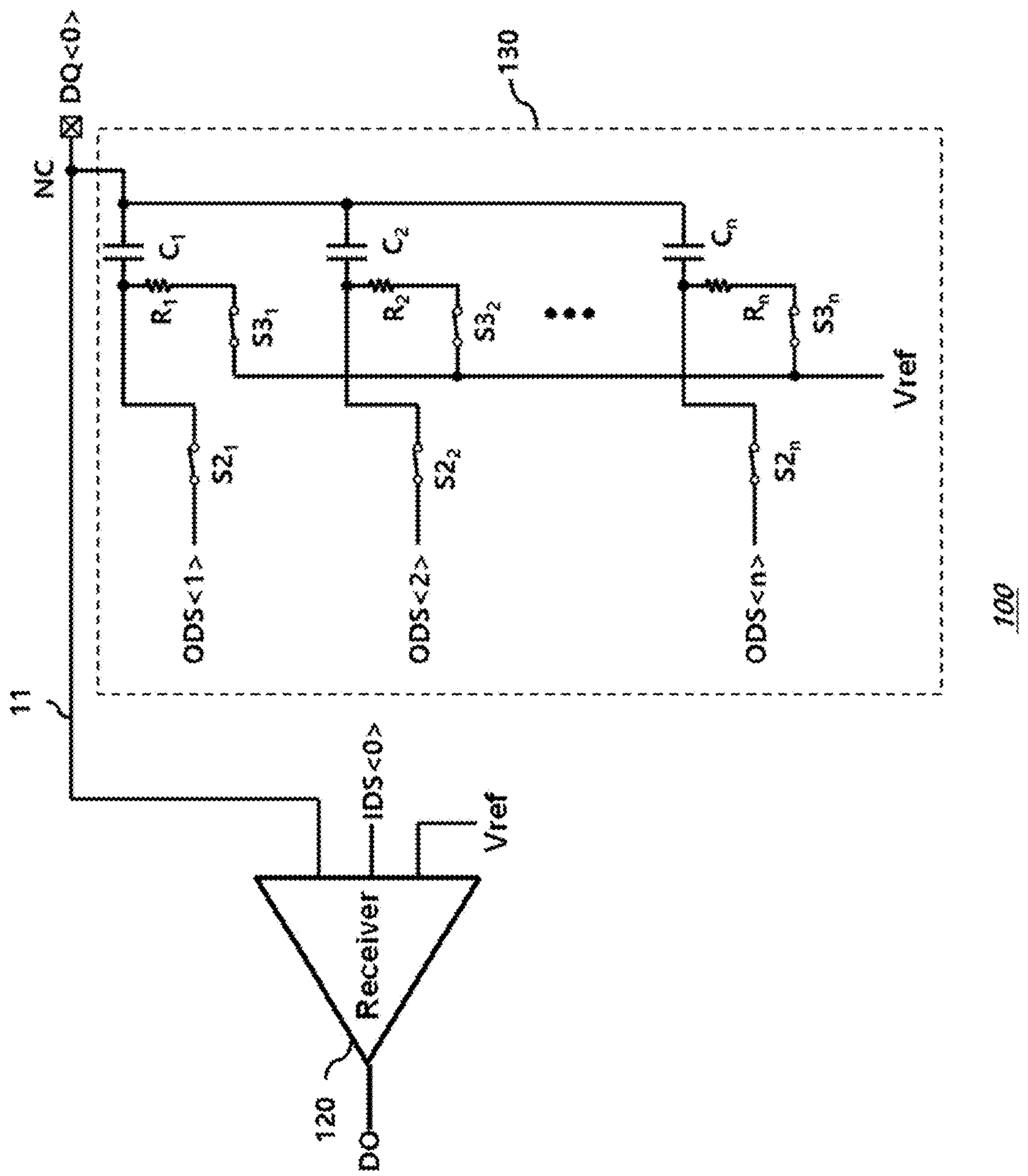
FIG. 5 illustrates a transceiver in a reception mode according to an embodiment of the present disclosure.

FIG. 5 is a circuit diagram showing the transceiver 100 in the reception mode according to an embodiment of the present disclosure.

In the reception mode, the first switch S1 is turned off and the second switch S2 and the third switch S3 are turned on. In an embodiment, in the reception mode, the switching network circuit 130 has a second circuit including at least one pair of a capacitor and a resistor, each pair constituting a differentiator circuit, and provides at least one output differentiation signal by differentiating the channel signal DQ<0>. For example, the switching network circuit 130 has a second circuit including n pairs of n capacitors $C_1$ to $C_n$ and n resistors $R_1$ to $R_n$, respectively. Each of the n pairs functions as a differentiator circuit that provides a respective one of a plurality of output differentiation signals ODS<1> to ODS<n>. In other words, the second circuit includes a plurality of differentiator circuits commonly connected to the channel connection node NC.

Accordingly, the switching network circuit 130 provides voltage corresponding to a signal obtained by differentiating the channel signal DQ<0> as output differentiation signals ODS<1> to ODS<n>.

That is, the $i^{th}$ output differentiation signal ODS<i> output from the switching network circuit 130 corresponds to crosstalk component in which the channel #0 affects the channel #i. For example, the plurality of sub-switching network circuits $\mathbf{131}_1$ to $\mathbf{131}_n$ of the switching network circuit 130 generate the plurality of second output differentiation signals ODS<1> to ODS<n> that indicate crosstalk noise components affecting the plurality of other channels #1 to #n, respectively.

The input differentiation signal #0 IDS<0> input to the differentiation signal input terminal of the receiver 120 is the sum of output differentiation signals ODS<0> generated by other switching network circuits in the transceivers connected to other channels #1 to #n.

That is, the input differentiation signal #0 IDS<0> input to the differentiation signal input terminal of the receiver 120 corresponds to a sum of crosstalk noise in the channel #0 affected by each of other channels from #1 to #n. Specifically, n output differentiation signals ODS<0>, which indicate respective crosstalk noise components in the channel #0 affected by the other channels #1 to #n, are summed to form the input differentiation signal IDS<0> before the receiver 120 receives the input differentiation signal IDS<0>. As a result, the input differentiation signal IDS<0> is input to a gate of a single transistor (e.g., the third transistor MP3 in FIG. 3) of the receiver 120. In contrast, a conventional receiver may have a resistively loaded summer structure in which a plurality of channel signals are input to a plurality of differentiator circuits connected to a plurality of transistors to perform crosstalk cancellation. Since the receiver 120 according to an embodiment of the present disclosure includes a smaller number of elements required for crosstalk cancellation than those of the conventional receiver, circuit area and power consumption of the receiver 120 may be reduced compared to the conventional receiver.

Since the technology for removing crosstalk at the receiving entity using a channel signal and a differentiation signal is known in the art, a detailed description thereof may be omitted for the interest of brevity.

The receiver 120 may further include an equalization circuit (e.g., a decision feedback equalization (DFE) circuit) connected to the first output node ON1 and the second output node ON2 to further improve signal quality.

Since the configuration and operation of the DFE circuit are known in the art, detailed description thereof will be omitted for the interest of brevity.

As aforementioned, in embodiments of the present disclosure, the ISI cancellation operation and the crosstalk removal operation can be performed together using the switching network circuit included in the transceiver.

Figure 6:
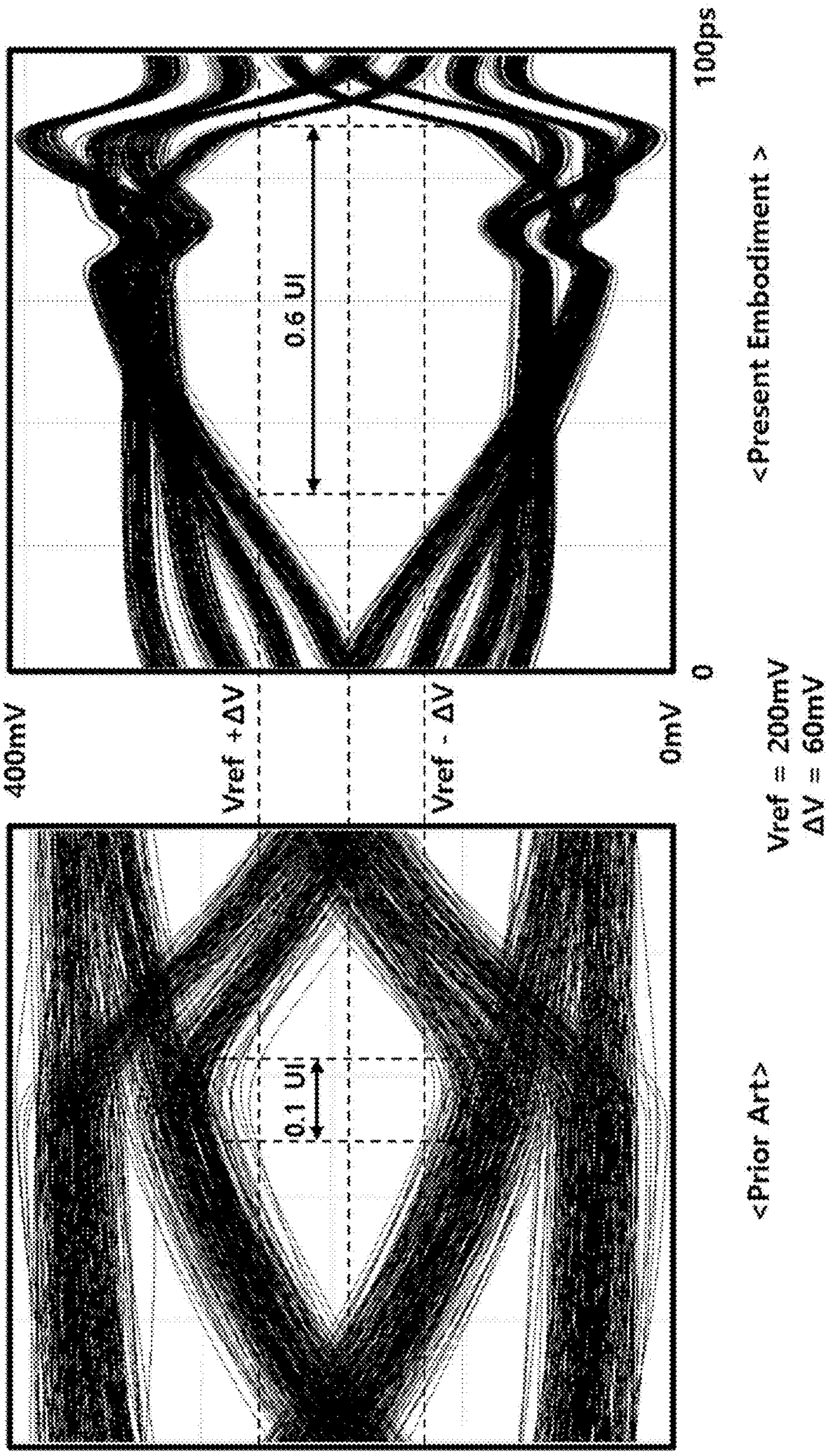
FIG. 6 is a simulation graph showing an effect of an embodiment of the present disclosure.

FIG. 6 is a simulation graph showing the effect of a transceiver according to an embodiment of the present disclosure.

The left figure Prior Art represents an eye diagram showing a data signal output from a receiver in a conventional transceiver.

The right figure Present Embodiment represents an eye diagram showing a data signal output from the receiver 120 when the transceiver 100 includes the switching network circuit 130 according to an embodiment of the present disclosure.

As shown in FIG. 6, compared to the prior art, in this embodiment, the eye opening is further increased and crosstalk is noticeably reduced by removing ISI when a transceiver performs a transmission operation and removing crosstalk noise when the transceiver performs a reception operation through switching network circuits included therein, where a plurality of transceivers are connected to a common channel.

Although various embodiments have been illustrated and described, various changes and modifications may be made to the above-described embodiments.

What is claimed is:

1. A transceiver connected to a specific channel via a channel connection node, the transceiver comprising:

a transmitter configured to drive a first node and a second node based on an input data signal in a transmission mode, the first node connected to the channel connection node;

a receiver configured to receive a specific channel signal from the channel connection node and provide an output data signal based on the specific channel signal and an input differentiation signal in a reception mode, the input differentiation signal being generated based on at least one first output differentiation signal, the at least one first output differentiation signal being obtained by differentiating at least one other channel signal received from at least one other channel, the at least one other channel being connected to at least one other transceiver and different from the specific channel that conveys the specific channel signal; and a switching network circuit connected between the second node and the channel connection node, wherein the switching network circuit has a first circuit in the transmission mode, wherein, in the reception mode, the switching network circuit has a second circuit and provides at least one second output differentiation signal by differentiating the channel signal, and wherein each of the at least one first output differentiation signal indicates a time-derivative of a corresponding one of the at least one other channel signal, and each of the at least one second output differentiation signal indicates a time-derivative of the specific channel signal.

2. The transceiver of claim 1, wherein the transmitter includes:

a driving circuit configured to drive the first node based on the input data signal; and an inverter circuit configured to drive the second node by inverting an inverted version of the input data signal.

3. The transceiver of claim 1, wherein the receiver includes:

a signal receiving circuit configured to receive the channel signal; and a differentiation signal receiving circuit connected to an output node of the signal receiving circuit and configured to receive the input differentiation signal.

4. The transceiver of claim 3, wherein the channel signal and the input differentiation signal affect voltage of a signal at the output node of the signal receiving circuit in opposite directions when the receiver generates the output data signal.

5. The transceiver of claim 3, wherein the receiver further comprises a data output circuit which is connected to the output node of the signal receiving circuit and generates the output data signal.

6. The transceiver of claim 3, wherein the receiver further includes an equalization circuit connected to the output node of the signal receiving circuit.

7. The transceiver of claim 6, wherein the equalization circuit is a decision feedback equalization (DFE) circuit.

8. The transceiver of claim 1, wherein the first circuit of the switching network circuit has to an equivalent capacitor connected between the second node and the channel connection node in the transmission mode.

9. The transceiver of claim 8, wherein the first circuit includes a plurality of capacitors connected in parallel to each other between the second node and the channel connection node.

10. The transceiver of claim 1, wherein the at least one second output differentiation signal is a plurality of second output differentiation signals, and the second circuit of the switching network circuit includes a plurality of differentiator circuits commonly connected to the channel connection node and providing the plurality of second output differentiation signals, respectively.

11. The transceiver of claim 1, wherein the at least one other channel is a plurality of other channels, and the switching network circuit includes a plurality of sub-switching network circuits corresponding to the plurality of other channels, respectively.

12. The transceiver of claim 11, wherein the at least one second output differentiation signal is a plurality of second output differentiation signals, and the plurality of sub-switching network circuits generate the plurality of second output differentiation signals that indicate crosstalk noise components affecting the plurality of other channels, respectively.

13. The transceiver of claim 11, wherein the at least one second output differentiation signal is a plurality of second output differentiation signals, and a sub-switching network circuit among the plurality of sub-switching network circuit includes:

a differentiator circuit to provide a corresponding one of the second output differentiation signals to a third node;

a first switch connected between the second node and the third node;

a second switch having one terminal connected to the third node; and a third switch providing a reference voltage to the differentiator circuit, wherein the first switch is turned on in the transmission mode, and the second switch and the third switch are turned on in the reception mode, and wherein the other terminal of the second switch provides the corresponding one of the second output differentiation signal output from the differentiation circuit in the reception mode.

14. The transceiver of claim 1, wherein the at least one first output differentiation signal is a plurality of first output differentiation signals, and the at least one other channel is a plurality of other channels, and wherein the plurality of first output differentiation signals indicate crosstalk noise components in the specific channel affected by the plurality of other channels, respectively.

15. The transceiver of claim 14, wherein the input differentiation signal is generated by summing the plurality of first output differentiation signals.

16. The transceiver of claim 15, wherein the at least one other channel signal is a plurality of other channel signals, and a plurality of other transceivers than the transceiver include a plurality of sub-switching network circuits, respectively, each of the sub-switching network circuits receiving a corresponding one of the other channel signals and differentiating the received channel signal to output a corresponding one of the first output differentiation signals.

17. The transceiver of claim 1, wherein the specific channel and the at least one other channel are System-in-Package (SiP) channels in High Bandwidth Memory (HBM).

18. The transceiver of claim 1, wherein each of the at least one first output differentiation signal is obtained using a differentiation circuit differentiating a corresponding one of the at least one other channel signal.

19. The transceiver of claim 1, wherein the first circuit of the switching network circuit in the transmission mode includes a plurality of capacitors connected in parallel to each other, and wherein the second circuit of the switching network circuit in the reception mode includes a plurality of differentiator circuits, each of the differentiator circuits is an RC differentiator.

* * * * *